United States Patent
Tseng et al.

(10) Patent No.: US 10,038,363 B2
(45) Date of Patent: Jul. 31, 2018

(54) VOICE COIL MOTOR

(71) Applicant: LARGAN PRECISION CO., LTD., Taichung (TW)

(72) Inventors: Te-Sheng Tseng, Taichung (TW); Wen-Hung Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 422 days.

(21) Appl. No.: 14/997,604

(22) Filed: Jan. 18, 2016

(65) Prior Publication Data

US 2017/0155311 A1   Jun. 1, 2017

(30) Foreign Application Priority Data

Dec. 1, 2015 (TW) .............................. 104219295 U

(51) Int. Cl.
*G02B 7/02* (2006.01)
*H02K 41/035* (2006.01)

(52) U.S. Cl.
CPC ................................ *H02K 41/0356* (2013.01)

(58) Field of Classification Search
CPC ................................................. H02K 41/0356
USPC .................................................. 359/823–824
See application file for complete search history.

(56) References Cited

U.S. PATENT DOCUMENTS

| | | | |
|---|---|---|---|
| 7,474,473 B1 | 1/2009 | Wang | |
| 7,663,823 B2 | 2/2010 | Chung | |
| 8,194,336 B2 | 6/2012 | Kimoto | |
| 8,284,505 B2 | 10/2012 | Wang | |
| 8,319,886 B1 | 11/2012 | Wang et al. | |
| 8,503,121 B2 | 8/2013 | Osaka et al. | |
| 8,537,226 B2 | 9/2013 | Ke | |
| 8,582,222 B2 | 11/2013 | Huang et al. | |
| 8,736,988 B2 * | 5/2014 | Cheng | G02B 6/4457 359/694 |
| 9,057,812 B2 | 6/2015 | Okuyama et al. | |
| 9,778,436 B2 * | 10/2017 | Lu | G02B 7/09 |
| 2014/0340775 A1 * | 11/2014 | Hsu | H04M 1/0264 359/824 |
| 2015/0055234 A1 * | 2/2015 | Nakagawa | G02B 7/08 359/824 |

* cited by examiner

*Primary Examiner* — Alexander Talpalatski
(74) *Attorney, Agent, or Firm* — McClure, Qualey & Rodack, LLP

(57) ABSTRACT

A voice coil motor includes a holder, a metal yoke, a carrier, a plurality of magnets, a coil and at least two spring plates. The magnets are disposed in the metal yoke. The coil is wound around the carrier and adjacent to the magnets. The spring plates are coupled to the carrier. The holder includes a first opening, a cylindrical sidewall and at least two radial protrusions. The cylindrical sidewall is disposed around the first opening. The radial protrusions protrude from the cylindrical sidewall. The metal yoke is coupled to the holder and includes a second opening and a plurality of inner walls. The carrier is movably disposed in the metal yoke and includes at least two radial enlarged portions and a plurality of notches. Each of the radial enlarged portions is disposed correspondingly to each of the radial protrusions.

13 Claims, 8 Drawing Sheets

VOICE COIL MOTOR

RELATED APPLICATIONS

This application claims priority to Taiwan Application Serial Number 104219295, filed on Dec. 1, 2015, which is herein incorporated by reference.

BACKGROUND

Technical Field

The present disclosure relates to a voice coil motor. More particularly, the present disclosure relates to a voice coil motor which is applicable to optical lenses in electronic devices.

Description of Related Art

In general, the voice coil motor (VCM) is applied to the optical lens in the electronic device for providing an auto-focusing function, and the spring plates of the voice coil motor are generally assembled on the carrier. When the optical lens is carried to move by the carrier, the spring plates are deformed by force to provide moving freedom and restoring force for the carrier so as to achieve the auto-focusing function of the optical lens.

However, regardless of the assembling process of the voice coil motor and the optical lens, or the auto-focusing operation of the optical lens, the conventional mechanism of the voice coil motor usually results in decreasing flatness and causing permanent distortion and deformation of the spring plates, so that it becomes difficult to satisfy more accurate requirements of the auto-focusing function of the optical lens.

Given the above, how to maintain the flatness of the spring plates during the assembling process for improving the assembling yield rate and satisfying more accurate requirements of the auto-focusing function of the optical lenses has become one of the important subjects.

SUMMARY

According to one aspect of the present disclosure, a voice coil motor includes a holder, a metal yoke, a carrier, a plurality of magnets, a coil and at least two spring plates. The magnets are disposed in the metal yoke. The coil is wound around the carrier and adjacent to the magnets. The spring plates are coupled to the carrier. The holder includes a first opening, a cylindrical sidewall and at least two radial protrusions. The cylindrical sidewall is disposed around the first opening. The radial protrusions and the cylindrical sidewall are formed integrally. The radial protrusions protrude from the cylindrical sidewall. The metal yoke is coupled to the holder and includes a second opening and a plurality of inner walls. The cylindrical sidewall extends from the first opening towards the second opening. The inner walls are connected to the second opening and disposed towards the first opening. The carrier is movably disposed in the metal yoke and includes at least two radial enlarged portions and a plurality of notches. Each of the radial enlarged portions is disposed correspondingly to each of the radial protrusions. The notches are located on one side of the carrier towards the second opening, wherein each of the notches is disposed correspondingly to each of the inner walls.

DETAILED DESCRIPTION

Figure 1:
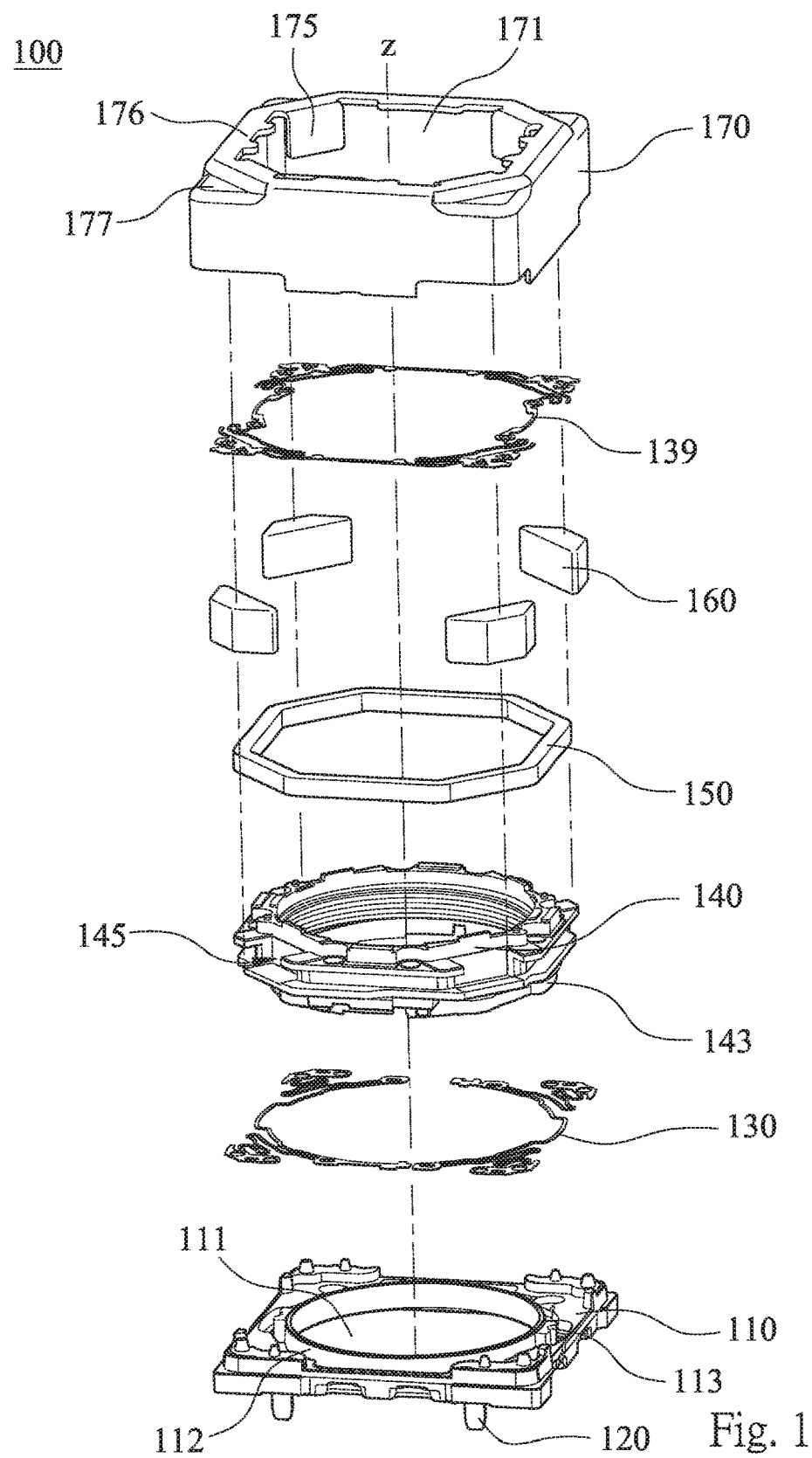
FIG. 1 is an exploded view of a voice coil motor according to one embodiment of the present disclosure.

FIG. 1 is an exploded view of a voice coil motor 100 according to one embodiment of the present disclosure. In FIG. 1, the voice coil motor 100 includes a holder 110, a metal yoke 170, a carrier 140, a plurality of magnets 160, a coil 150 and at least two spring plates. According to the embodiment of FIG. 1, the voice coil motor 100 includes two spring plates, which are a first spring plate 130 and a second spring plate 139 respectively, but not limited thereto.

Figure 2:
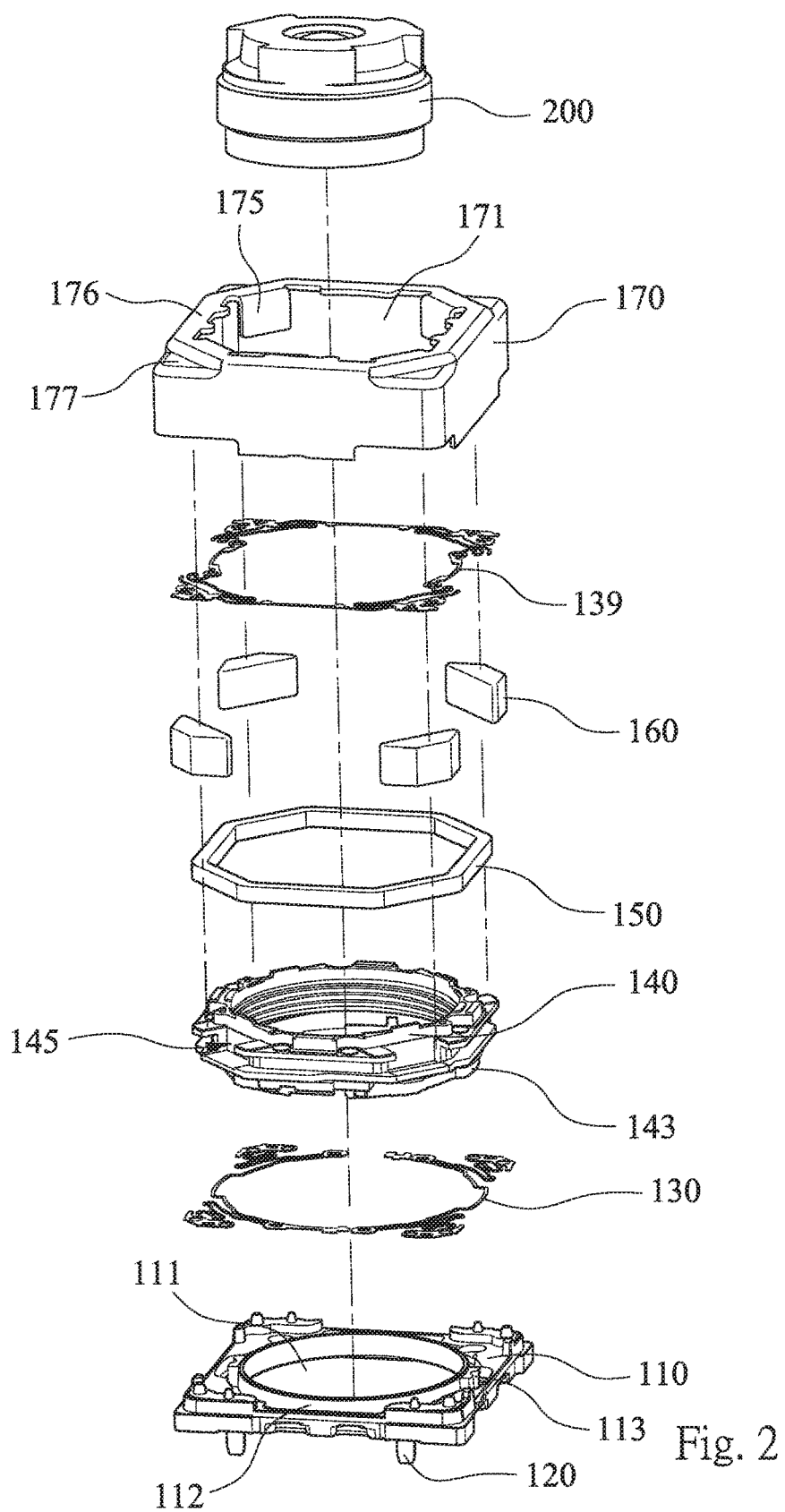
FIG. 2 is an exploded view of a lens assembly assembled to the voice coil motor of FIG. 1.
Figure 3:
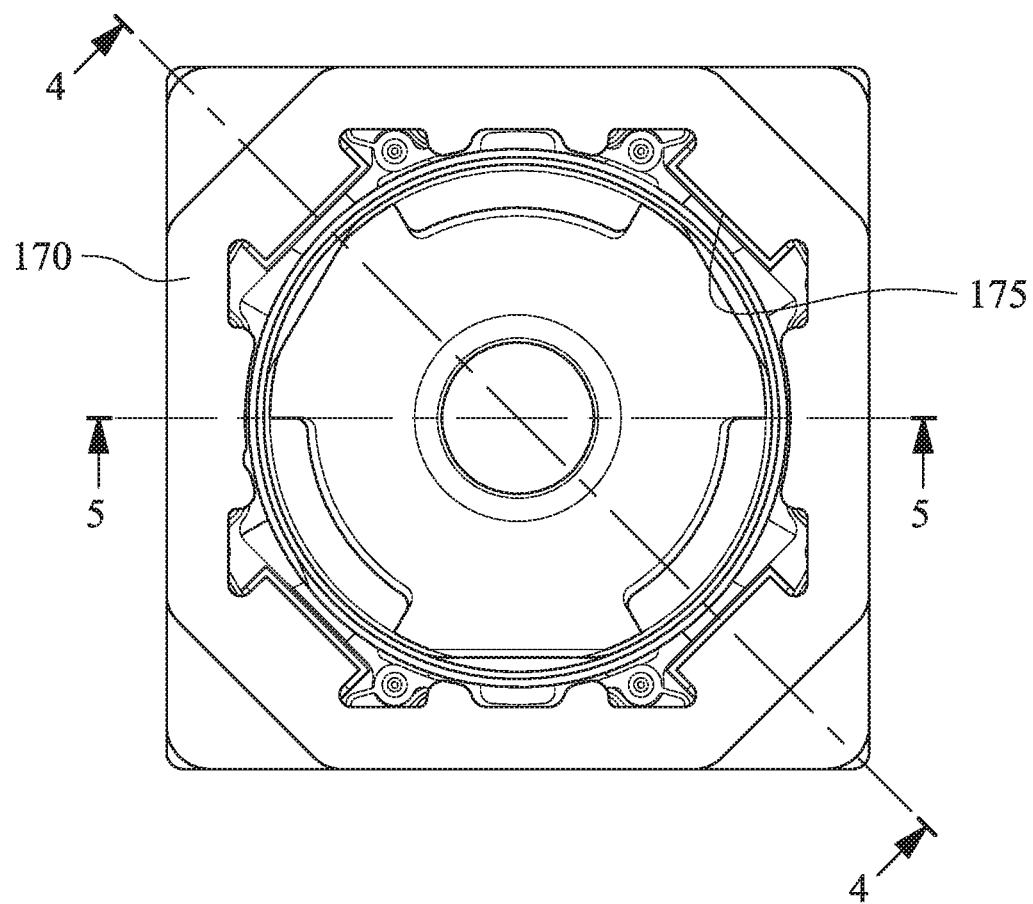
FIG. 3 is a top view of the voice coil motor and the lens assembly of FIG. 2.

FIG. 2 is an exploded view of a lens assembly 200 assembled to the voice coil motor 100 of FIG. 1, and FIG. 3 is a top view of the voice coil motor 100 and the lens assembly 200 of FIG. 2. In FIG. 2 and FIG. 3, the voice coil motor 100 can be applied to the lens assembly 200 so as to provide an auto-focusing mechanism for the lens assembly 200.

Figure 4:
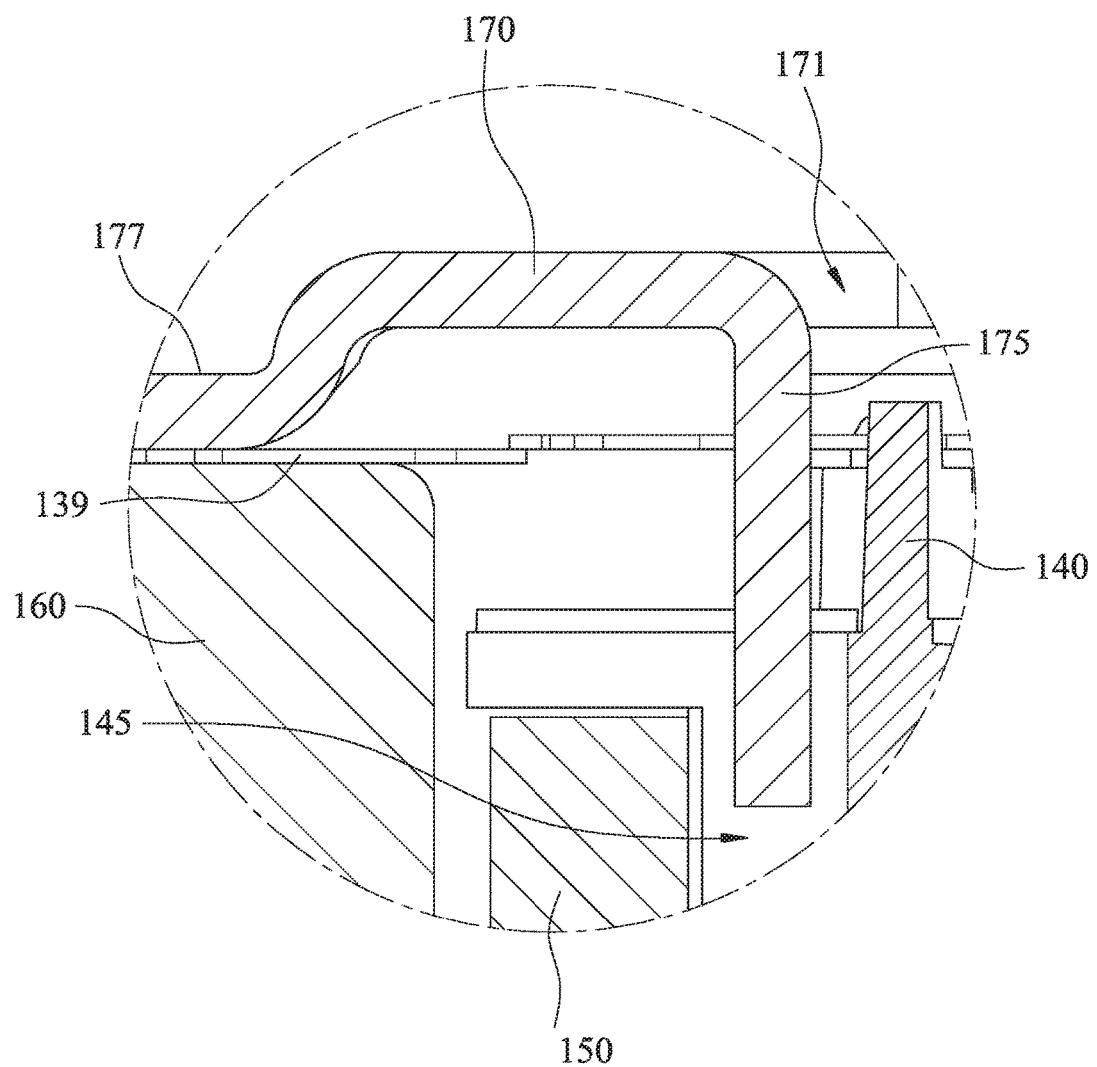
FIG. 4 is a cross-sectional view along line 4-4 of FIG. 3.

FIG. 4 is a cross-sectional view along line 4-4 of FIG. 3. In FIG. 1 and FIG. 4, the magnets 160 are disposed in the metal yoke 170. The coil 150 is wound around the carrier 140 and adjacent to the magnets 160.

In FIG. 1, the holder 110 includes a first opening 111, a cylindrical sidewall 112 and at least two radial protrusions 113. The cylindrical sidewall 112 is disposed around the first opening 111. The radial protrusions 113 and the cylindrical sidewall 112 are formed integrally. The radial protrusions 113 protrude from the cylindrical sidewall 112. That is, the radial protrusions 113 are farther from the first opening 111 than the cylindrical sidewall 112.

In FIG. 1, the metal yoke 170 is coupled to the holder 110 and includes a second opening 171 and a plurality of inner walls 175. The cylindrical sidewall 112 of the holder 110 extends from the first opening 111 towards the second opening 171. The inner walls 175 are connected to the second opening 171 and disposed towards the first opening 111.

According to the embodiment of FIG. 1, the first spring plate 130 and the second spring plate 139 are both coupled to the carrier 140. Therefore, when the lens assembly 200 is carried to move by the carrier 140, the first spring plate 130 and the second spring plate 139 are deformed by force to provide moving freedom and restoring force for the carrier 140 so as to achieve the auto-focusing function of the lens assembly 200.

In FIG. 1, the carrier 140 is movably disposed in the metal yoke 170 and includes at least two radial enlarged portions 143 and a plurality of notches 145, wherein each of the radial enlarged portions 143 is disposed correspondingly to each of the radial protrusions 113, and each of the notches 145 is disposed correspondingly to each of the inner walls 175. When the lens assembly 200 is carried to move by the carrier 140, each of the radial enlarged portions 143 is disposed correspondingly to each of the radial protrusions 113, so that the first spring plate 130 can be coupled to and positioned on the carrier 140, and each of the notches 145 is disposed correspondingly to each of the inner walls 175, so that the second spring plate 139 can be coupled to and positioned on the carrier 140. Hence, the carrier 140 is carried to move by the first spring plate 130 and the second spring plate 139, so that the lens assembly 200 can be telescopically focused.

Figure 5:
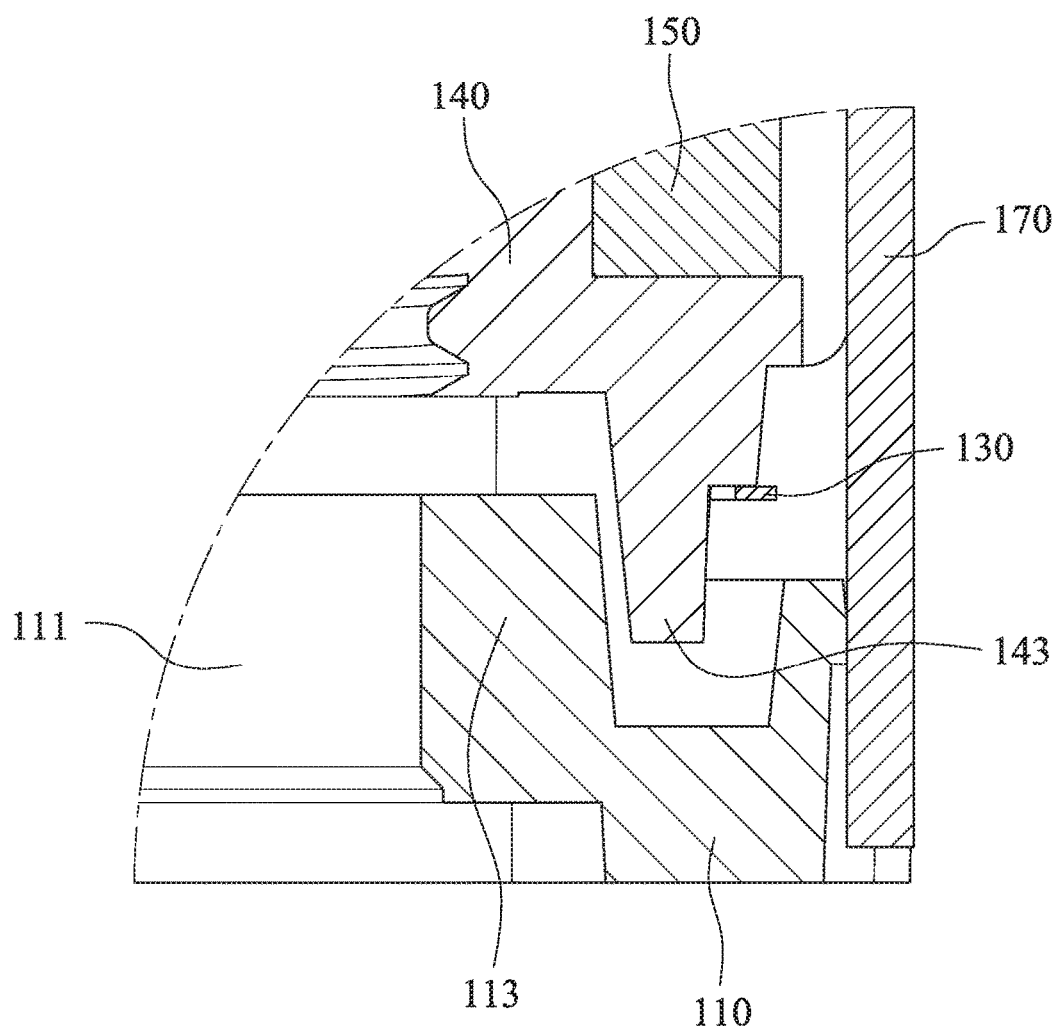
FIG. 5 is a cross-sectional view along line 5-5 of FIG. 3.
Figure 6:
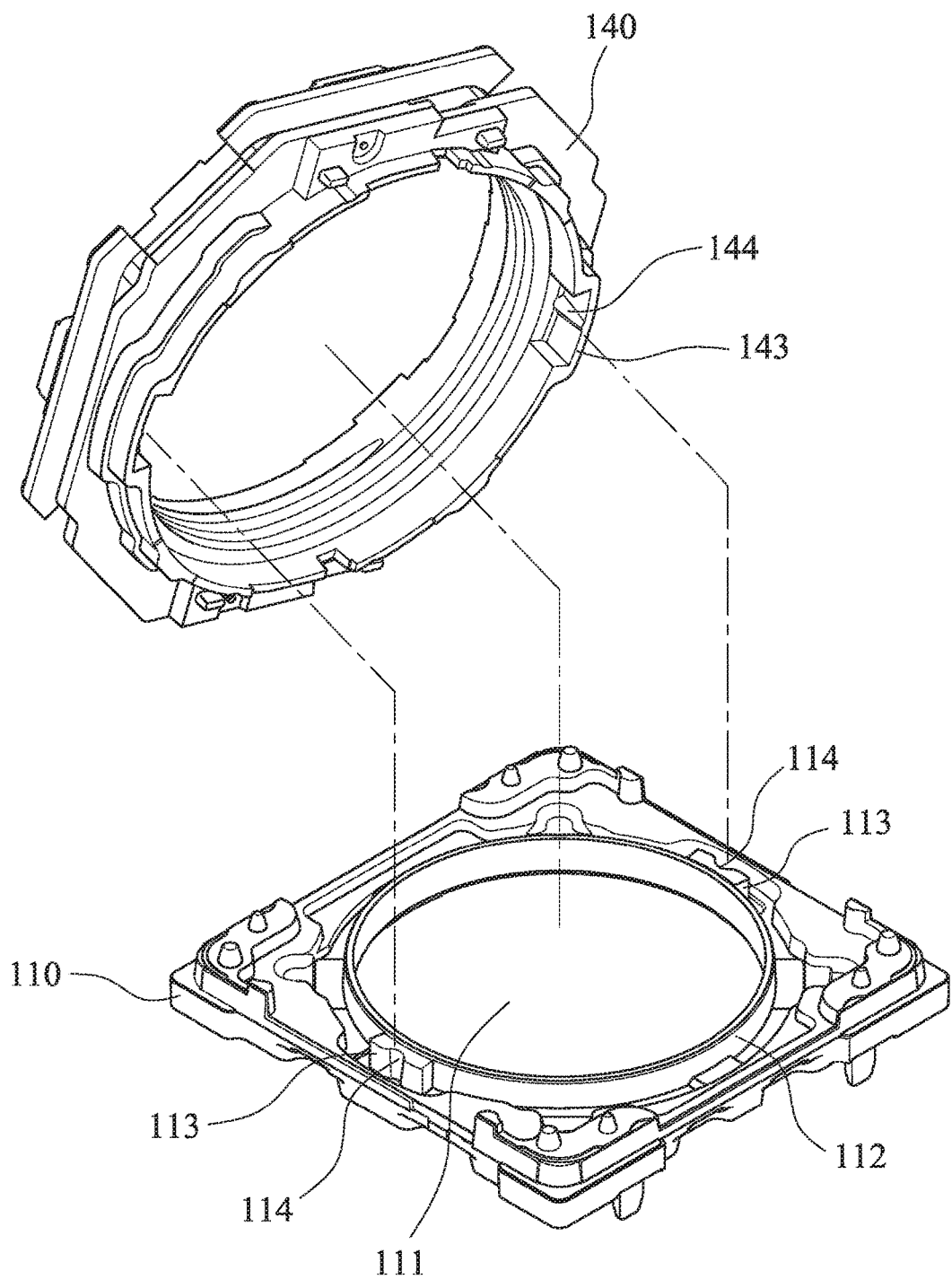
FIG. 6 is a schematic view of a holder and a carrier according to the embodiment of FIG. 1.

FIG. 5 is a cross-sectional view along line 5-5 of FIG. 3, and FIG. 6 is a schematic view of the holder 110 and the carrier 140 according to the embodiment of FIG. 1. In FIG. 5 and FIG. 6, a number of the radial protrusions 113 and a number of the radial enlarged portions 143 can be the same, and each of the radial enlarged portions 143 is disposed correspondingly to each of the radial protrusions 113, so that the first spring plate 130 can be coupled and positioned between the radial protrusions 113 and the radial enlarged portions 143. Therefore, an anti-torsion function of the voice coil motor 100 can be achieved by the radial protrusions 113 and the radial enlarged portions 143 so as to maintain flatness and prevent permanent distortion and deformation of the first spring plate 130 during assembling the voice coil motor 100 and the lens assembly 200. According to the embodiment of FIG. 5 and FIG. 6, the number of the radial protrusions 113 and the number of the radial enlarged portions 143 are both two, but not limited thereto.

Furthermore, in FIG. 1 and FIG. 6, each of the radial enlarged portions 143 can include a reverse structure 144. The reverse structure 144 protrudes from the radial enlarged portion 143 towards a central axis z and tapers from the second opening 171 towards the first opening 111. Moreover, each of the radial protrusions 113 can include a recessed structure 114, the recessed structure 114 is disposed correspondingly and embedded to the reverse structure 144 of each of the radial enlarged portions 143. Therefore, it is favorable for enhancing the anti-torsion function by the radial enlarged portions 143 and the radial protrusions 113 so as to maintain flatness and prevent permanent distortion and deformation of the first spring plate 130 during assembling the voice coil motor 100 and the lens assembly 200.

Figure 7:
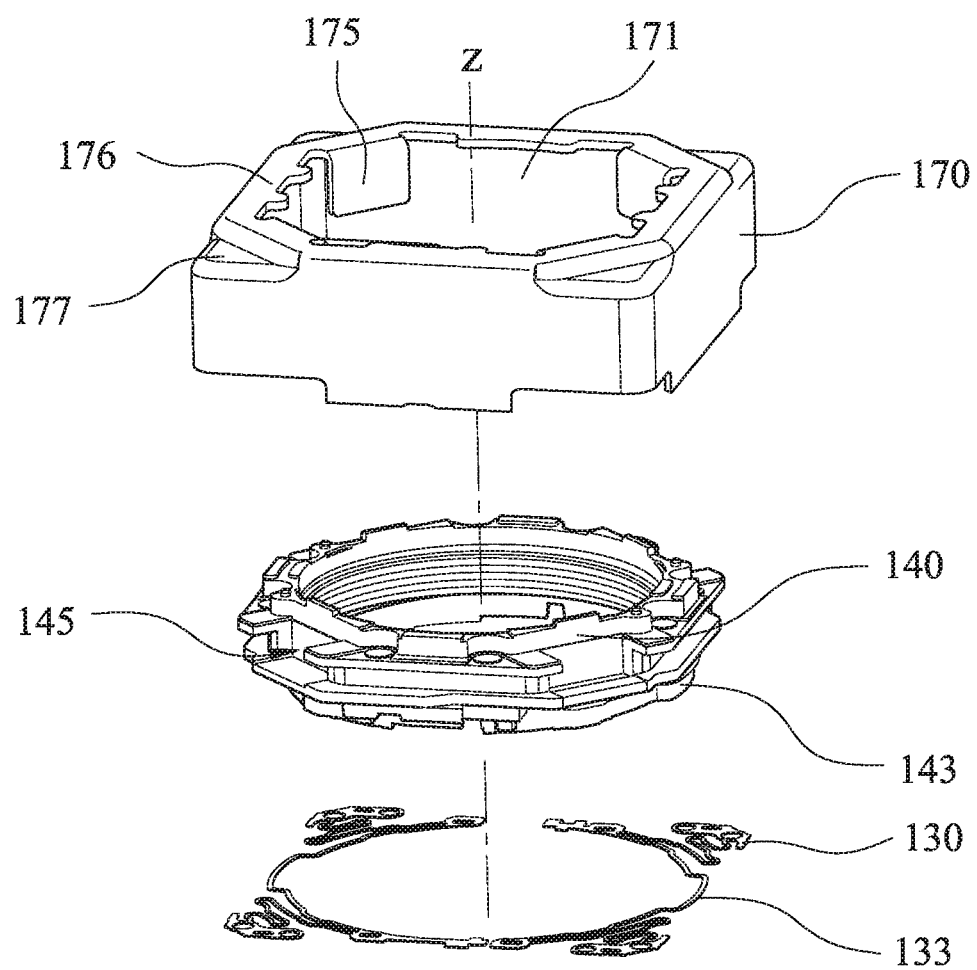
FIG. 7 is a schematic view of a metal yoke, the carrier and a first spring plate according to the embodiment of FIG. 1.

FIG. 7 is a schematic view of the metal yoke 170, the carrier 140 and the first spring plate 130 according to the embodiment of FIG. 1. In FIG. 4 and FIG. 7, the notches 145 are located on one side of the carrier 140 towards the second opening 171, and each of the notches 145 is disposed correspondingly to each of the inner walls 175, so that the second spring plate 139 can be coupled and positioned between the notches 145 and the inner walls 175. Therefore, another anti-torsion function of the voice coil motor 100 can be achieved by the notches 145 and the inner walls 175 so as to maintain flatness and prevent permanent distortion and deformation of the second spring plate 139 during assembling the voice coil motor 100 and the lens assembly 200. According to the embodiment of FIG. 4 and FIG. 7, a number of the notches 145 is four. Each of the notches 145 is located correspondingly to each of the inner walls 175 disposed at each of four inner corners of the metal yoke 170, but not limited thereto.

In details, in FIG. 1 and FIG. 7, the first spring plate 130 can be nearer the first opening 111 than the second spring plate 139. The first spring plate 130 can include at least two radial matching portions 133. A number of the radial matching portions 133 and the number of the radial enlarged portions 143 can be the same, and each of the radial matching portions 133 is coupled to each of the radial enlarged portions 143. Therefore, it is favorable for enhancing the assembling firmness between the first spring plate 130 and the carrier 140. According to the embodiment of FIG. 1 and FIG. 7, the number of the radial matching portions 133 is two, but not limited thereto.

In FIG. 6, the radial protrusions 113 can be symmetrically disposed around the first opening 111. Therefore, it is favorable for reducing the structural complexity of the voice coil motor 100.

Figure 8:
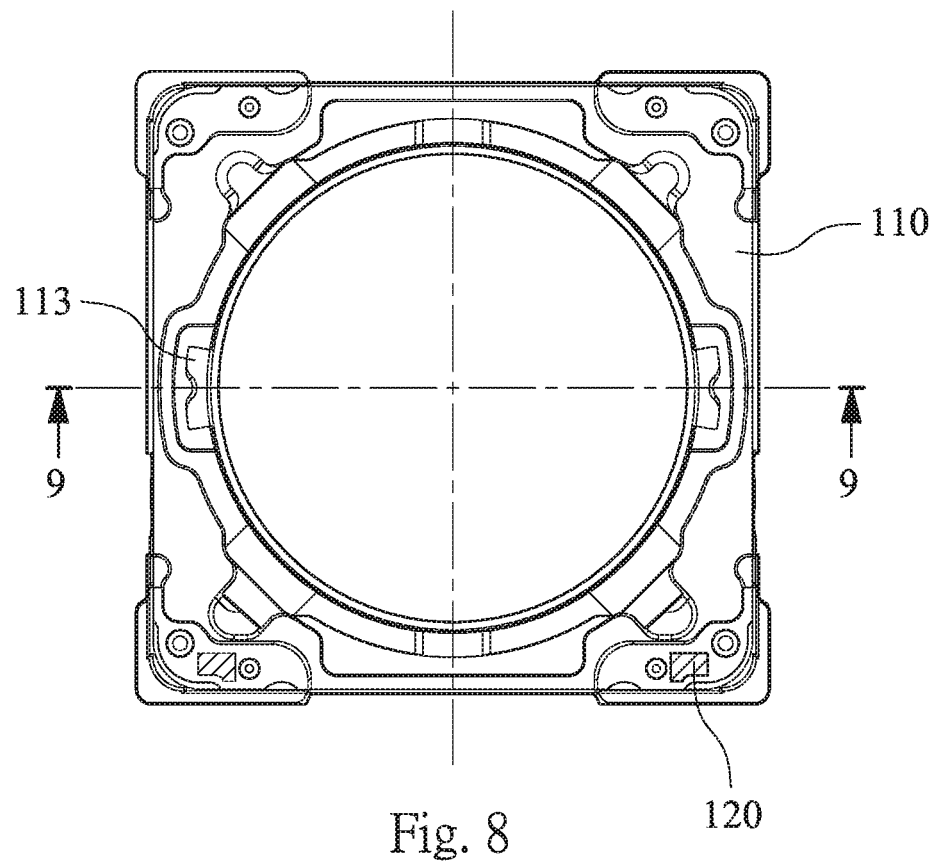
FIG. 8 is a top view of the holder according to the embodiment of FIG. 1.
Figure 9:
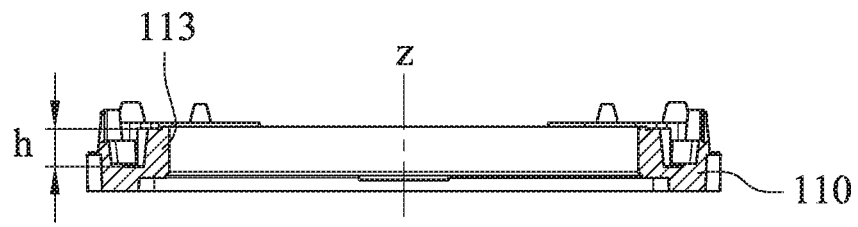
FIG. 9 is a cross-sectional view along line 9-9 of FIG. 8.

FIG. 8 is a top view of the holder 110 according to the embodiment of FIG. 1, and FIG. 9 is a cross-sectional view along line 9-9 of FIG. 8. In FIG. 8 and FIG. 9, when a height of each of the radial protrusions 113 parallel to the central axis z is h, the following condition can be satisfied: 0.20 mm<h<0.85 mm. Therefore, it is favorable for maintaining the compact size of the voice coil motor 100 and enhancing the anti-torsion function by the radial enlarged portions 143 and the radial protrusions 113 so as to maintain flatness and prevent permanent distortion and deformation of the first spring plate 130 during assembling the voice coil motor 100 and the lens assembly 200. According to the embodiment of FIG. 9, the following condition is satisfied: h=0.51 mm, but not limited thereto.

In FIG. 1 and FIG. 8, the voice coil motor 100 can further include at least two metal terminals 120 embedded to the holder 110 and electrically connected to the first spring plate 130. The first spring plate 130 is nearer the holder 110 than the second spring plate 139. The first spring plate 130 includes two portions electrically connected to the two metal terminals 120 respectively, wherein the two portions of the first spring plate 130 do not electrically conduct to each other. Therefore, it is favorable for enhancing the manufacturing efficiency and reducing the assembling steps of the voice coil motor 100. According to the embodiment of FIG. 1 and FIG. 8, a number of the metal terminals 120 is two, but not limited thereto.

Furthermore, the metal terminals 120 can be embedded in the holder 110 and made of an insert molding. Therefore, it is favorable for mass production.

In FIG. 1, each of the first spring plate 130 and the second spring plate 139 can be flat sheet. That is, both of the first spring plate 130 and the second spring plate 139 include neither folded projections parallel to the central axis z nor structures connecting to each other. Therefore, it is favorable for saving the processing time and cost of the first spring plate 130 and the second spring plate 139.

In FIG. 1, the coil 150 can be polygon. Preferably, the coil 150 can be octagon. Therefore, it is favorable for increasing the uniformity of the magnetic flux of the coil 150 corresponding to the magnets 160.

In FIG. 1 and FIG. 4, each of the magnets 160 can be trapezoidal cylinder. That is, the two surfaces orthogonal to the central axis z (the normal line of each of the two surfaces is parallel to the central axis z) of each of the magnets 160 are both trapezoid. Each of the magnets 160 can be disposed at each of inner corners of the metal yoke 170 and around the coil 150. Therefore, it is favorable for magnetic polarization of the voice coil motor 100 during the assembling process, easily designing the tools corresponding to the magnets 160 as trapezoidal cylinders, and dispensing to assemble the magnets 160 and the metal yoke 170. According to the embodiment of FIG. 1 and FIG. 4, each of the magnets 160 is disposed at each of four inner corners of the metal yoke 170 and around the coil 150, but not limited thereto.

In FIG. 1 and FIG. 4, the metal yoke 170 can further include a front end portion 176, wherein the second opening 171 is disposed on the front end portion 176. The front end portion 176 includes a plurality of stepped surfaces 177, wherein a number of the stepped surfaces 177 and a number of the magnets 160 can be the same, and each of the stepped surfaces 177 is disposed correspondingly to each of the magnets 160 for adjusting a relative position parallel to the central axis z between the magnets 160 and the second opening 171. It is favorable for providing a proper relative position parallel to the central axis z between the magnets 160 and the second opening 171 so as to obtain a sufficient movable range of the coil 150 in the voice coil motor 100 with the compact size. According to the embodiment of FIG. 1 and FIG. 4, the number of the stepped surfaces 177 is four, but not limited thereto.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A voice coil motor, comprising:
 a holder, comprising:
  a first opening;
  a cylindrical sidewall disposed around the first opening; and
  at least two radial protrusions, wherein the radial protrusions and the cylindrical sidewall are formed integrally, and the radial protrusions protrude from the cylindrical sidewall;
 a metal yoke coupled to the holder and comprising:
  a second opening, wherein the cylindrical sidewall extends from the first opening towards the second opening; and
  a plurality of inner walls connected to the second opening and disposed towards the first opening;
 a carrier movably disposed in the metal yoke and comprising:
  at least two radial enlarged portions, wherein each of the radial enlarged portions is disposed correspondingly to each of the radial protrusions; and
  a plurality of notches located on one side of the carrier towards the second opening, wherein each of the notches is disposed correspondingly to each of the inner walls;
 a plurality of magnets disposed in the metal yoke;
 a coil wound around the carrier and adjacent to the magnets; and
 at least two spring plates coupled to the carrier.

2. The voice coil motor of claim 1, further comprising:
 at least two metal terminals embedded in the holder and electrically connected to at least one of the spring plates.

3. The voice coil motor of claim 1, wherein the radial protrusions are symmetrically disposed around the first opening.

4. The voice coil motor of claim 2, wherein the spring plates are a first spring plate and a second spring plate respectively, the first spring plate is nearer the first opening than the second spring plate, the first spring plate comprises at least two radial matching portions, and each of the radial matching portions is coupled to each of the radial enlarged portions.

5. The voice coil motor of claim 2, wherein each of the magnets is trapezoidal cylinder and disposed at each of inner corners of the metal yoke and around the coil.

6. The voice coil motor of claim 2, wherein the metal terminals are embedded in the holder and made of an insert molding.

7. The voice coil motor of claim 2, wherein the coil is polygon.

8. The voice coil motor of claim 7, wherein the coil is octagon.

9. The voice coil motor of claim 2, wherein each of the spring plates is flat sheet.

10. The voice coil motor of claim 1, wherein the metal yoke further comprises:
 a front end portion, wherein the second opening is disposed on the front end portion, the front end portion comprises a plurality of stepped surfaces, and each of the stepped surfaces is disposed correspondingly to each of the magnets for adjusting a relative position parallel to a central axis between the magnets and the second opening.

11. The voice coil motor of claim 1, wherein each of the radial enlarged portions comprises a reverse structure, and the reverse structure protrudes from the radial enlarged portion towards a central axis and tapers from the second opening towards the first opening.

12. The voice coil motor of claim 11, wherein each of the radial protrusions comprises a recessed structure, and the recessed structure is disposed correspondingly to the reverse structure of each of the radial enlarged portions.

13. The voice coil motor of claim 1, wherein a height of each of the radial protrusions parallel to a central axis is h, and the following condition is satisfied:

$$0.20 \text{ mm} < h < 0.85 \text{ mm}.$$

* * * * *